(12) United States Patent
Paananen et al.

(10) Patent No.: US 8,864,995 B2
(45) Date of Patent: Oct. 21, 2014

(54) METHOD FOR SEPARATING BETAINE

(75) Inventors: Hannu Paananen, Kantvik (FI); Pia Saari, Helsinki (FI); Nina Nurmi, Helsinki (FI)

(73) Assignee: Dupont Nutrition Biosciences APS, Copenhagen K (DK)

( * ) Notice: Subject to any disclaimer, the term of this patent is extended or adjusted under 35 U.S.C. 154(b) by 2469 days.

(21) Appl. No.: 11/328,800

(22) Filed: Jan. 10, 2006

(65) Prior Publication Data

US 2007/0158269 A1    Jul. 12, 2007

(51) Int. Cl.
  *B01D 15/36*      (2006.01)
  *C13B 20/14*      (2011.01)

(52) U.S. Cl.
  CPC ............ *C13B 20/144* (2013.01); *B01D 15/362* (2013.01); *C13B 20/148* (2013.01)
  USPC ........ 210/635; 210/638; 210/656; 210/198.2; 127/46.2

(58) Field of Classification Search
  CPC ... B01D 15/362; C13B 20/144; C13B 20/148
  USPC ...................... 210/659, 635, 638, 656, 198.2; 127/46.2
  See application file for complete search history.

(56) References Cited

U.S. PATENT DOCUMENTS

| | | | |
|---|---|---|---|
| 3,533,929 A * | 10/1970 | Hamilton et al. | 205/760 |
| 3,715,235 A | 2/1973 | Moebes et al. | |
| 4,359,430 A | 11/1982 | Heikkilä et al. | |
| 5,032,686 A | 7/1991 | Duflot et al. | |
| 6,770,757 B2 | 8/2004 | Paananen et al. | |
| 2002/0120135 A1 | 8/2002 | Heikkilä et al. | |
| 2002/0169311 A1 | 11/2002 | Paananen et al. | |
| 2004/0006222 A1 * | 1/2004 | Paananen et al. | 536/123.13 |
| 2004/0006223 A1 * | 1/2004 | Karki et al. | 536/124 |
| 2005/0161401 A1 | 7/2005 | Heikkilä et al. | |
| 2006/0134148 A1 * | 6/2006 | Hollenbeck | 424/400 |

FOREIGN PATENT DOCUMENTS

| | | |
|---|---|---|
| EP | 0 020 124 A1 | 12/1980 |
| EP | 1 333 103 A1 | 8/2003 |
| WO | WO 02/27038 A1 | 4/2002 |
| WO | WO 2004/002938 A1 | 1/2004 |

OTHER PUBLICATIONS

Japanese Patent Application No. 10179200, dated Jul. 7, 1998 (Abstract).
Tanaka K., et al., "Separation of Carboxylic Acids on a Weakly Acidic Cation-Exchange Resin by Ion-Exclusion Chromatography", Journal of Chromatography, 850:187-196 (1999).
Giacobello S. et al., "Design of a Simulated Moving Bed Unit for Sucrose-Betaine Separations", Journal of Chromatography 872(1-2):23-35 (2000).

* cited by examiner

*Primary Examiner* — Ernest G Therkorn
(74) *Attorney, Agent, or Firm* — Scully, Scott, Murphy & Presser, P.C.

(57) ABSTRACT

The invention relates to a method for separating betaine from fermentation process solutions, vinasse and other sugar beet based solutions on a weakly acid cation exchange resin in $H^+$-form in the chromatographic separation process. The present invention relates also to use of a weakly acid cation exchange resin in $H^+$-form for the chromatographic separation of betaine.

41 Claims, 6 Drawing Sheets

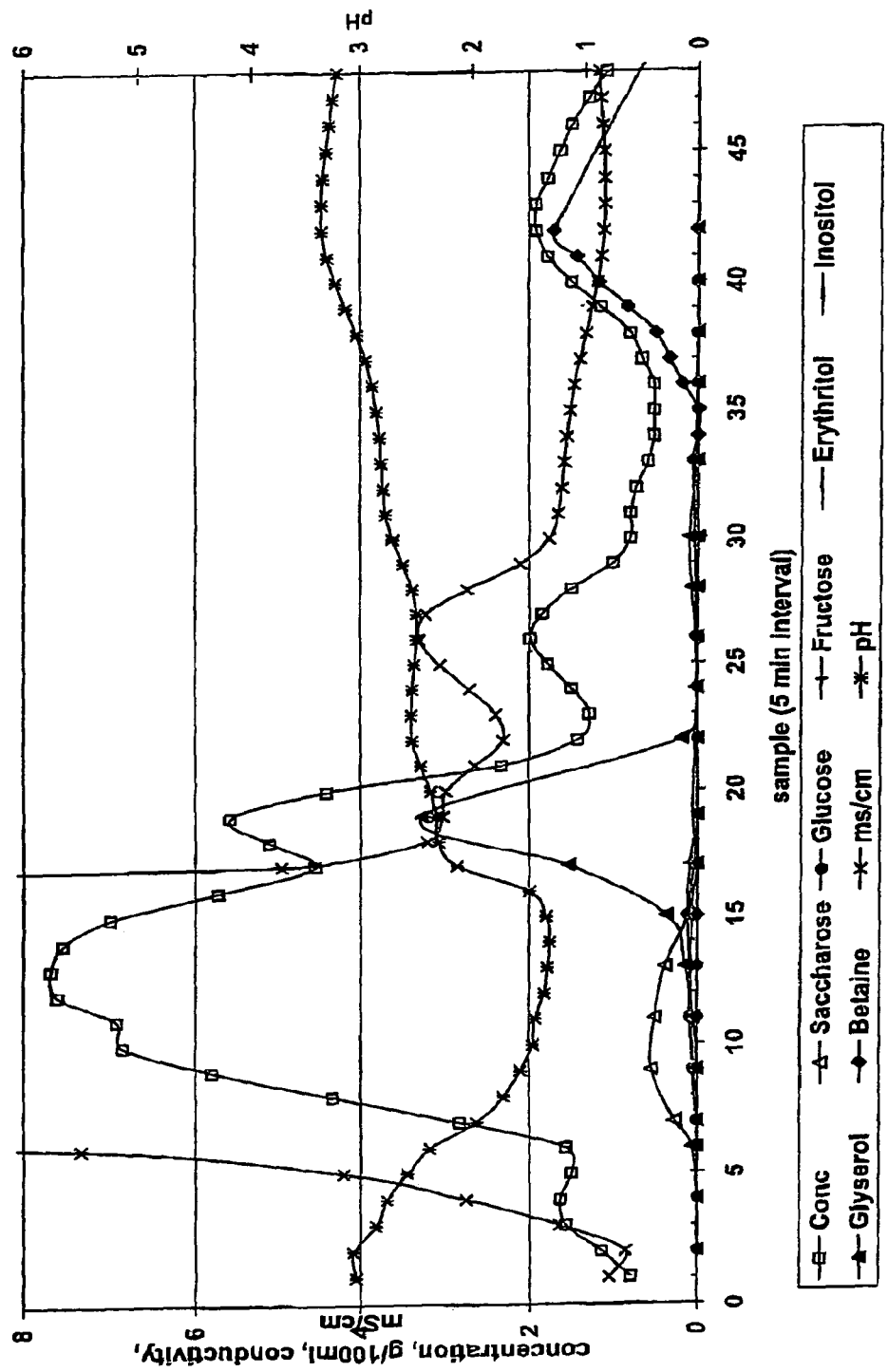

METHOD FOR SEPARATING BETAINE

FIELD OF THE INVENTION

The present invention relates to a method for chromatographic separation of betaine on a weakly acid cation exchange resin in $H^+$-form from sugar beet based solutions. Suitable sugar beet based solutions are for example solutions obtained from the processing of beet derived solutions, molasses, fermentation process solutions and vinasses. The present invention relates also to a method for chromatographic separation of additional compounds such as polyols and/or carboxylic acids on a weakly acid cation exchange resin in $H^+$-form from sugar beet based solutions.

BACKGROUND OF THE INVENTION

Chromatographic separation has been used for recovering betaine, from natural materials such as beet molasses, betaine molasses and vinasse. The resins most commonly used in the known chromatographic separations have been strong acid cation exchangers, i.e. sulfonated polystyrene cross-linked from 3.5 to 8% by weight with divinyl benzene, the resin being in monovalent or divalent form. Water has generally been a preferred eluent, but the problem when using water has been that the various products, such as betaine, erythritol, inositol, sucrose and mannitol have similar retention times, whereby the fractions have overlapped.

U.S. Pat. No. 4,359,430 describes a process for recovering betaine from molasses and vinasse by using a chromatographic column of a salt of a polystyrene sulphonate cation exchange resin, and eluting with water. The strong acid cation exchange resin is in alkali metal form. The first fraction separated is a waste fraction, the second fraction contains a substantial pro-portion of the sugars of the feed solution and the third fraction consists principally of betaine.

US Patent Application 2002/0120135 describes a method for chromatographic separation of rhamnose and arabinose from other monosaccharides in xylose crystallization run-off using a weakly acid cation exchange resin in $H^+/Mg^{2+}$-form.

US Patent Application 2005/0161401 describes a chromatographic method for separating betaine, mannitol, glycerol and inositol from each other using a weakly basic anion exchange resin.

U.S. Pat. No. 6,770,757 describes a process for recovering betaine and additional compounds, such as erythritol, inositol, mannitol, glycerol and amino acids from starting materials containing the corresponding compounds using a weakly acid cation exchange resin in $Na^+$-form in a chromatographic separation system. The pH-values of the feed solutions vary between pH 6 and pH 11 and the ones for the effluent, the solution coming out of the column, vary from 6.5 to 11. Betaine eluted from the system after salts, followed by erythritol, mannitol and glycerol. Inositol eluted last as a separate peak.

U.S. Pat. No. 5,032,686 describes a method for recovering citric acid from fermentation liquors using a strong acid cation exchange resin in $H^+$-form. The first eluted fractions contained high molecular weight compounds such as saccharose, maltose and isomaltose. The subsequent fractions contained citric acid and the last fractions contained for example betaine and various organic acids such as gluconic acid, oxalic acid.

Tanaka K., et al., (Journal of Chromatography 850 (1999), 187-196) disclose analytical ion-exclusion chromatographic method for separating carboxylic acids on a weakly acid cation exchange resin in $H^+$-form. When water was used as an eluent, the peak shape and the resolution between carboxylic acids were not satisfactory. In order to improve the peak shape, a diluted sulphuric acid solution was tested as the eluent. Further, the addition of methanol to this eluent was found to reduce the retention times of the carboxylic acids having hydrophobic nature. In addition to the molecular size exclusion and the ion exclusion, the order of elution was affected by the pKa-values and the hydrophobic/hydrophilic nature of the carboxylic acids.

It has surprisingly been found that when using a weakly acid cation exchange resin in $H^+$-form, betaine can be separated from sugar beet based solutions such as fermentation process solutions, vinasses and other sugar beet derived solutions as a separate fraction eluting after the compounds previously known to elute after betaine. The order of elution of betaine on a weakly acid cation exchange resin in $H^+$-form is thus different from that previously known on strongly acid cation exchange resins or on a weakly acid cation exchange resin in $Na^+$-form. This phenomenon is especially advantageous when fractioning multi-component solutions containing betaine and other compounds which have had similar or nearly similar retention times on the other separation medias.

SUMMARY OF THE INVENTION

The present invention relates to a method for chromatographic separation of betaine from sugar beet based solutions on a weakly acid cation exchange resin in $H^+$-form. The present invention also relates to a method for chromatographic separation of additional compounds such as polyols and/or carboxylic acids from sugar beet based solutions on a weakly acid cation exchange resin in $H^+$-form. Further, the present invention relates to a method for chromatographic separation of betaine from other carboxylic compounds on a weakly acid cation exchange resin in $H^+$-form. In addition, the present invention relates to a method for separating betaine from a sugar beet based solution in a chromatographic separation system, where a weakly acid cation exchange resin in $H^+$-form is used in at least one chromatographic column or a part of a column for the chromatographic separation. The present invention relates also to a method for chromatographic separation of betaine from sugar beet based solutions on a weakly acid cation exchange resin in $H^+$-form wherein pH of the chromatographic system is used to regulate and/or control the retention factor of betaine. Further, the present invention relates to the use of a weakly acid cation exchange resin in $H^+$-form for chromatographic separation of betaine and optionally also additional compounds such as polyols and/or carboxylic acids from a sugar beet based solution. The present invention relates also to the use of a weakly acid cation exchange resin in $H^+$-form for chromatographic separation of betaine from other carboxylic compounds.

BRIEF DESCRIPTION OF THE DRAWINGS

The following drawings are illustrative embodiments of the invention and are not meant to limit the scope of the invention as defined in the claims.

FIG. 6 is a graphical presentation of the elution profiles and pH according to Example 6.

DETAILED DESCRIPTION OF THE INVENTION

Figure 1:
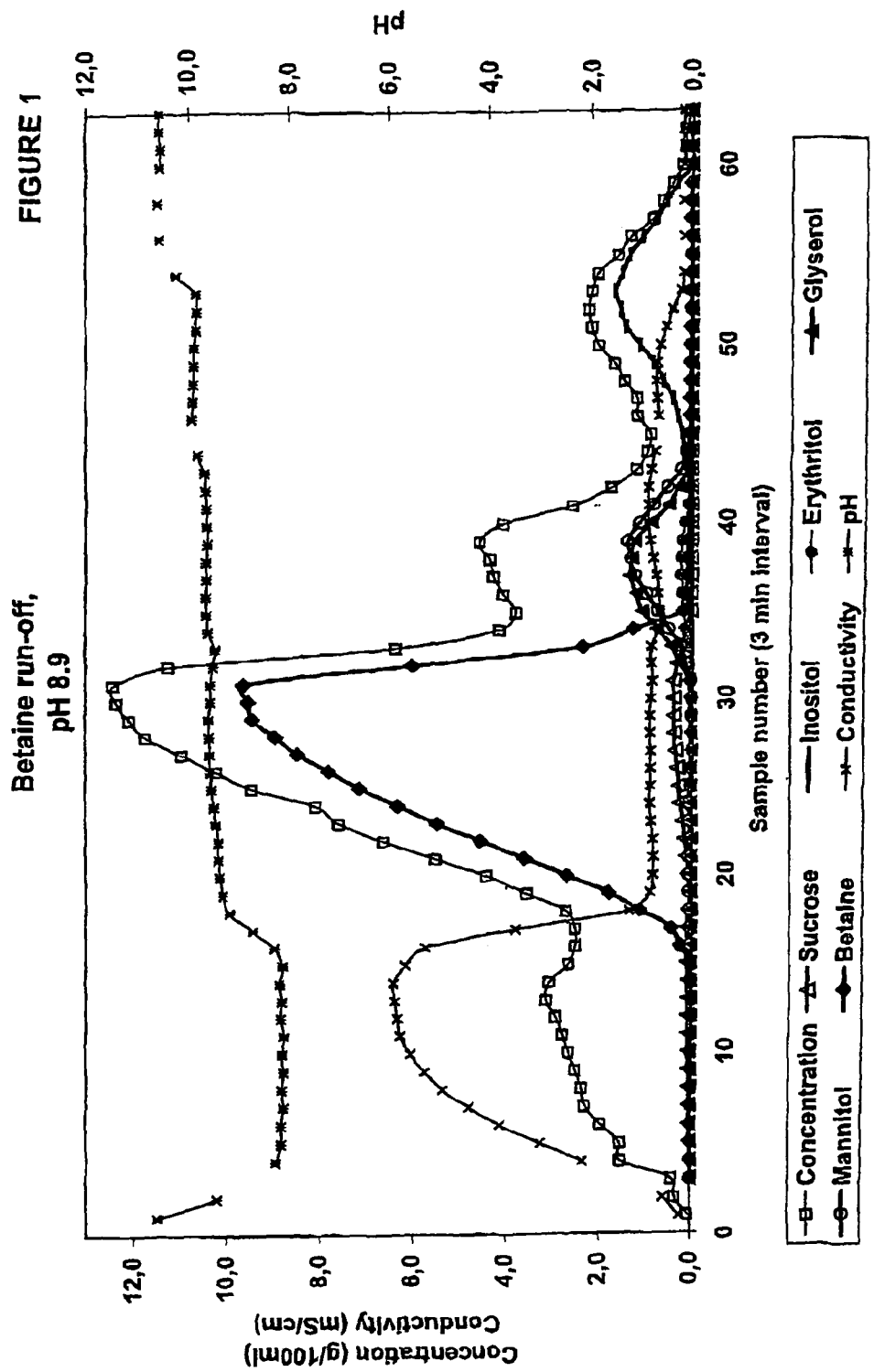
FIG. 1 is a graphical presentation of the elution profiles and pH according to Example 1.

There is a continuous demand for exploiting additional raw materials for the recovery of industrially and/or nutritionally valuable compounds like betaine, polyols and carboxylic acids. One alternative solution for the recovery of these compounds is using sugar beet based fermentation process solutions, such as for example citric acid, yeast or ethanol fermentation process solutions or vinasses, such as for example citric acid or ethanol vinasses as raw materials. It has now surprisingly been found that when using a weakly acid cation exchange resin in $H^+$-form, betaine can be separated as a very pure fraction from fermentation process solutions. In addition, the acidic fermentation process solutions or a vinasse in general, and especially vinasse from citric acid fermentation broth, was found to be suitable for chromatographic separation on a weakly acid cation exchange resin in $H^+$-form. Accordingly, pre-treating the solution to adjust the pH before the chromatographic separation would not be necessary.

In the circumstances described above, a strong acid cation exchange resin (SAC) in $H^+$-form, for example, would not remain stable. When there are salts in the feed solution, the functional group of the SAC resin will change very easily from $H^+$-form into the metal cation form even in acidic environment unlike weakly acid cation exchange resin do.

According to the present invention, a weakly acid cation exchange resin in $H^+$-form is used in a method for the chromatographic separation of betaine from sugar beet based solutions. According to the present invention, a weakly acid cation exchange resin in $H^+$-form is also used in a method for the chromatographic separation of also additional compounds, such as polyols and carboxylic acids, in addition to betaine from sugar beet based solutions. Further, according to the present invention a weakly acid cation exchange resin in $H^+$-form is used in a method for the chromatographic separation of betaine from other carboxylic compounds. According to the present invention, a weakly acid cation exchange resin in $H^+$-form is used at least in one chromatographic separation step for separating betaine. In addition, according to the present invention a weakly acid cation exchange resin in $H^+$-form is used in at least one chromatographic column or one partial packed bed of a column in a chromatographic separation system for separating betaine from sugar beet based solutions.

In the present invention, a weakly acid cation exchange resin in $H^+$-form refers to a weakly acid cation exchange resin mainly in undissociated COOH-form. The amount of the undissociated COOH-form of the weakly acid cation exchange resin of the invention is more than 50%, preferably at least 67% and more preferably over 90%.

The sugar beet based solution of the present invention is any solution, hydrolysate and/or extract derived from sugar beet. The solution may be obtained from further processing of such beet derived solutions by fermentation, for example a citric acid, yeast or an ethanol fermentation or from the processing of sugar beet derived solutions, such as beet and/or betaine molasses or vinasse. Fermentation solutions, molasses and vinasse are typically rich in inorganic salts and contain a mixture of various kinds of organic compounds. The additional compounds to be separated by the method of the present invention are polyols such as erythritol, inositol, mannitol and glycerol and/or carboxylic acids such as citric acid, lactic acid, acetic acid, oxalic acid and pyrrolidone carboxylic acid and/or mixtures thereof. In the chromatographic separation of the present invention compounds are separated into fractions, which are enriched with a target compound. The enriched fraction contains higher concentration by weight on dry substance bases of the compound than the solution used as the feed solution.

The method of the present invention could be performed independently or it could be combined with or comprise other process steps such as e.g. an additional chromatographic separation, crystallization, evaporation, ion exchange, filtration, membrane filtration and/or some other known process step. The method according to the invention may preferably be combined or comprise one or more of the above-mentioned additional processing steps.

The additional chromatographic separation step could be performed using for example a strongly acid cation exchange resin (SAC), a strongly basic anion exchange resin (SBA) or a weakly basic anion exchange resin (WBA) depending on the composition of the sugar beet based starting solution and/or on the compounds chosen to be separated.

The method according to the invention may preferably be combined with or comprise an additional step for recovering betaine. The recovery of betaine could be performed, for example, by crystallization. The method according to the invention may optionally also be combined with or comprise a further step for recovering the additional compound or compounds, such as polyols and/or carboxylic acids.

The chromatographic column or a part of the column (partial packed bed of the column) used in the method of the present invention is filled with a weakly acid cation exchange resin in $H^+$-form, preferably an acrylic cation exchange resin having carboxylic functional groups. Such an acrylic resin is preferably derived from methyl acrylate, ethyl acrylate, butyl acrylate, methylmethacrylate or acrylonitrile or acrylic acids or mixtures thereof. The resin may be crosslinked with a crosslinking agent, e.g. divinyl benzene (DVB). A suitable crosslinking degree is 1 to 20%, preferably 3 to 8%. The average particle size of the resin is normally 10 to 2000 μm, preferably 100 to 400 μm.

The chromatographic separation is preferably performed at temperatures from 10 to 95° C., more preferably from 30 to 95° C., most preferably from 65 to 95° C. It is known that a higher separation temperature decreases the viscosity and improves the separation performance but is more harmful for the sensitive compounds of the feed solution.

The eluent used in the chromatographic separation according to the present invention is preferably water or pH-adjusted water.

The sugar beet based solution to be fractioned is optionally pre-treated before chromatographic separation by filtration, which can be carried out by using a pressure filter with or without a filter aid. Further, if needed the pH of the solution to be used as a feed solution is adjusted to below pH-value 6, preferably below pH-value 5.1, more preferably between pH-values 1.4-5.1, and most preferably between pH-values 3-4.5. When the pH of the feed solution is high (>4.2), the weakly acid cation exchange resin of the invention will partly change from its initial $H^+$-form into an ionic form and will accordingly be balanced on specific $H^+$-form level. The type of ionic form depends on the ions of the feed solution.

The feed solution may be filtered before or after the pH-adjustment. Prior to the chromatographic separation the dry substance of the feed solution is adjusted to an appropriate level.

A feeding device is used for feeding the solution to the column. The temperature of the column, feed solution and eluent is most preferably approximately the same as the temperature of the chromatographic separation. This is accomplished by preheating the feed solution. The feed solution is eluted in the column by feeding water, for instance demineralized water or condensate water or some other aqueous solution into the column. Preferably preheated eluent is used. The flow rate in the column is adjusted to an appropriate level. The fractions of the outcoming solutions are collected at suitable intervals and analyzed. The out-flow from the column may be monitored by on-line instruments. The fractionated products, e.g. betaine, and optionally also polyols such as erythritol, mannitol, inositol, glycerol and/or the carboxylic acids such as citric acid, oxalic acid, lactic acid, acetic acid and/or pyrrolidone carboxylic acid may be recovered by suitable methods such as for example crystallization.

The method of the present invention could be performed as a separate step in a multi-step process when an additional chromatographic separation, crystallization, evaporation and/or filtration, for example, is used at least once as an additional step of the multi-step process. Further, it is possible to arrange two or more chromatographic columns in sequence wherein at least one column or a part of the column contain a weakly acid cation exchange resin in $H^+$-form, the other column or columns containing the same or different type of resin such as for example a strongly acid cation exchange resin. The chromatographic system used can be either batch process or simulated moving bed system. The simulated moving bed system can be either continuous or sequential.

It is also possible to connect two chromatographic columns or part of the columns containing weakly acid cation exchange resin in $H^+$-form to each other by some other process units. The process units can be for example filtration, membrane filtration, pH-adjustment or concentration by evaporation. It is obvious for a person skilled in the art that the order of the process units may be selected and varied.

In one embodiment, the method of the invention is performed as an independent process. In this embodiment, the sugar beet based solution may be fractioned on a weakly acid cation exchange resin in $H^+$-form into a betaine containing fraction and optionally also an additional compound containing fraction. Preferably, betaine and optionally also the additional compound are further recovered from the fraction containing the specific compound. The additional compounds to be separated by the method of the present invention are polyols such as erythritol, inositol, mannitol, glycerol and/or carboxylic acids such as citric acid, lactic acid, acetic acid and pyrrolidone carboxylic acid and/or mixtures thereof.

In another embodiment, the method of the invention is performed as a separate step in a multi-step process wherein it is combined with at least one additional process step. In this embodiment, the sugar beet based solution may be fractioned on a first column containing for example strongly acid cation exchange resin which is connected to a second column containing a weakly acid cation exchange resin in $H^+$-form into a betaine containing fraction and optionally also an additional compound containing fraction. Preferably, betaine and optionally also the additional compound are further recovered from the fraction containing the specific compound. Such an arrangement further improves the separation performance and increases the yields and purity of the products. The yield of betaine is also improved by removing the side products from the process.

Yet in another embodiment, the method of the invention comprises at least one additional process step wherein method of the invention is a separate step in a multi-step process. The additional process step could be chromatographic separation, crystallization, evaporation, filtration and/or membrane filtration, for example.

In general, the order of elution of different compounds on weakly acid cation exchange resins seem to be affected in addition to the molecular size exclusion and ion exclusion by the hydrophobic/hydrophilic interactions of the compounds with the resin. According to the prior studies, the order of elution of different compounds (e.g. carboxylic acids) on weakly acid cation exchange resin in $H^+$-form is affected by the pKa-values of the compounds. Generally, the lower the pKa-value the shorter the retention time of the same compound is. However, the order of elution of betaine (pKa=1, 832) on a weakly acid cation exchange resin in $H^+$-form does not follow only these rules. Surprisingly, it seems that the weakly acid cation exchange resin in $H^+$-form is more hydrophobic than in metal cation form and has a very high affinity for betaine, which is a hydrophobic molecule.

In the method of the present invention the order of elution of the separated components in chromatographic column is different from the order obtained by the earlier methods e.g. based on using weakly acid cation exchange resin in $Na^+$-form or strongly acid cation exchange resins and this feature can be advantageously used in separating the components of a multi-component composition from each other. According to the present invention betaine is eluted after erythritol, inositol, mannitol, glycerol and carboxylic acids. Further, for example inositol is eluted before glycerol and betaine in the method of the invention.

Surprisingly, the retention volume and the retention factor of betaine were found to vary with the pH of the chromatographic separation, especially with the pH of the feed solution; the lower the pH the higher the retention factor. The elution of betaine from the chromatographic separation column is affected by changes in the pH of the feed solution while most of the carboxylic compounds elute approximately at the same time regardless of the pH of the feed solution. The retention factor of betaine can be controlled and/or regulated by adjusting the pH of chromatographic separation. The adjustment of the pH of the chromatographic separation can be done by adjusting the pH of eluent and/or feed, but is preferably performed by adjusting the pH of the feed solution to the desired level. For example by changing the pH of feed solution from pH 5.1 to pH 1.4 the retention factor of betaine will change from 1.3 to 2.9. Thus, by adjusting the pH of the feed solution, the chromatographic separation of betaine from other compounds in sugar beet based solutions can be optimized on a weakly acid cation exchange resin in $H^+$-form. The adjustment of pH of the feed solution can also be used to control and/or regulate the chromatographic separation of betaine from other carboxylic compounds on a weakly acid cation exchange resin in $H^+$-form.

The method according to the present invention makes it possible to enrich betaine from sugar beet based solution to betaine fraction with a maximum purity of more than 50% on dry solids (DS), advantageously more than 70% on DS.

The method according to the present invention makes it possible to separate and optionally also recover betaine in good yields and with high purity (80-95% on DS) from a sugar beet based solution such as fermentation process solutions and/or vinasses, which has been laborious by known methods using e.g. a weakly acid cation exchange resin in $Na^+$-form or a strongly acid cation exchange resin, For example, when strong acid cation exchange (SAC) resin is used for the chromatographic separation of betaine, the same yield and purity levels will be achieved with two chromatographic separations while only one separation on a weakly acid cation exchange resin in $H^+$-form is needed. Further, the method according to the present invention makes it possible to separate and recover also additional compounds such as polyols like erythritol, inositol, mannitol, glycerol and/or carboxylic acids like citric acid, lactic acid and/or pyrrolidone carboxylic acid in good yield and purity from fermentation process solutions or vinasses, which has also been laborious by known methods.

In one embodiment according to the method of the invention using of citric acid vinasse as a feed solution betaine can be enriched to a betaine fraction with the purity over 60% on DS, more preferably over 80% on DS, and citric acid to a separate fraction with the purity over 20% on DS, more preferably over 35% on DS, respectively.

One advantage of the method of the present invention is that one eluent, water, could be used efficiently for separating the desired compounds on a weakly acid cation exchange resin in $H^+$-form and also on the optional additional chromatographic steps. When water is used as the eluent in a chromatographic separation, the handling is easier, the costs are lower and the safety is higher. The different elution order of the separation of betaine and for example inositol gives additional benefit in the method of the present invention, making it possible to efficiently separate in addition to betaine also the additional compounds, such as erythritol, inositol, mannitol, glycerol, citric acid, lactic acid and/or pyrrolidone carboxylic acid.

According to IUPAC (International Union of Pure and Applied Chemistry), terms related to the chromatographic process and the theory of chromatography includes:

Hold-up volume (time) (VM, tM ) is equal to the retention volume (time) of an unretained compound.

Adjusted retention volume (time) (VR', tR') is the total elution volume (time) minus the hold-up volume (time).

Retention factor (k) is mathematically the ratio of the adjusted retention volume (time) and the hold-up volume (time): k=VR'/VM=tR'/tM.

The following examples illustrate the present invention. The examples are not to be construed to limit the claims in any manner whatsoever.

EXAMPLE 1

A Comparative Example Showing Chromatographic Separation of Betaine Run-off with a Weakly Acid Cation Exchange Resin in $Na^+$-form (pH 8.9)

Betaine run-off originated from a chromatographic separation of beet molasses and contained several compounds like betaine, inositol, erythritol, mannitol and glycerol. As a feed solution it was subjected to a chromatographic separation that was performed in a laboratory chromatographic separation column as a batch process. The column with a diameter of 0.045 m was filled with an acrylic weak acid cation exchange resin (Finex CA 12 GC) manufactured by Finex Oy, Finland. The resin was an ethyl acrylate-based resin. The height of the resin was about 0.70 m. The cross-linkage degree of the resin was 6.0% DVB and the average particle size of the resin was 0.26 mm. The resin was in $Na^+$-form. The pH of the resin was high after the manufacturing process. A feeding device was placed at the top of the resin bed. The temperature of the column, the feed solution and the eluent water was approximately 80° C. The flow rate in the column was adjusted to 4 ml/min. The feed solution was filtered via filter by using diatomaceous earth as a filter aid. The pH of the feed solution was 8.9.

The chromatographic separation was carried out as follows:

Step 1: The dry substance of the feed solution was determined and adjusted to 25 g dry substance in 100 g solution according to the refractive index (RI) of the solution.

Step 2: 100 ml of preheated feed solution was pumped to the top of the resin bed (through the feeding device).

Step 3: The feed solution was eluted downwards in the column by feeding preheated ion-exchanged water to the top of the column.

Step 4: 10 ml samples of the out coming solution were collected at 3 min intervals. Concentration, conductivity (mS/cm) and pH of samples were determined. The composition of the samples was analyzed with HPLC ($Ca^{2+}$-column, 0.6 ml/min, 0,001 M $Ca(NO_3)_2$, 85° C.

Betaine eluted from the column after salts. Saccharose had almost identical retention time than betaine. The hold-up volume of 99 min and elution time of 168 min gave betaine the retention factor of 0.7. Erythritol, mannitol and glycerol had almost similar retention time eluting almost as a one peak after betaine peak. Inositol eluted last as a separate peak. The elution order seems to be consistent with the hydrophobic/hydrophilic-nature of the components. The resin separated betaine and inositol from other main components well. The pH of the effluent (i.e. out-coming solution) was from 8 to 11. The separation profile is presented in FIG. 1.

EXAMPLE 2

Chromatographic Separation of Vinasse with a Weakly Acid Cation Exchange Resin in $H^+$-form (pH 3.6)

The starting liquor used for the separation was vinasse from a fermentation process of citric acid. The vinasse contained mainly betaine, glycerol, inorganic salts, and organic acids like citric acid and had approximately the following composition (% on RDS):

Betaine 17.1
Glycerol 1.8
Citrc acid 7.8
Others 73.3

The pH of the solution was 3.6.

The solution was filtered via filter by using diatomaceous earth as a filter aid. The vinasse was used as the feed solution and it was subjected to chromatographic separation. The separation was performed in a pilot scale chromatographic separation column as a batch process. The column with a diameter of 0.09 m was filled with a weak acid cation exchange resin (Finex CA 16 GC, 8% DVB, capacity 4.4 eqv/l) manufactured by Finex Oy, Finland. The resin was an acrylate based resin and the average particle size of the resin in sodium form was 0.41 mm. The resin was regenerated into hydrogen ($H^+$)-form after which the height of the resin bed was approximately 1.7 m. The temperature of the column, the feed solution and the eluent water was 75° C. The flow rate in the column was adjusted to 3 l/h.

The chromatographic separation was carried out repeating following steps:

Step 1: The dry substance of the feed solution was adjusted to 35 g dry substance in 100 g solution according to the refractive index (RI) of the solution.

Step 2: 640 ml of preheated feed solution was pumped to the top of the resin bed.

Step 3: The feed solution was eluted downwards in the column by feeding preheated ion-exchanged water to the top of the column.

Step 4: 50 ml samples of the out-coming solution were collected at 5 min intervals. Concentration, conductivity (mS/ cm) and pH of samples were determined. The composition of the samples was analyzed with HPLC ($Na^+$-column, 0.6ml/min, 85° C., 0.003 M $Na_2SO_4$).

Figure 2:
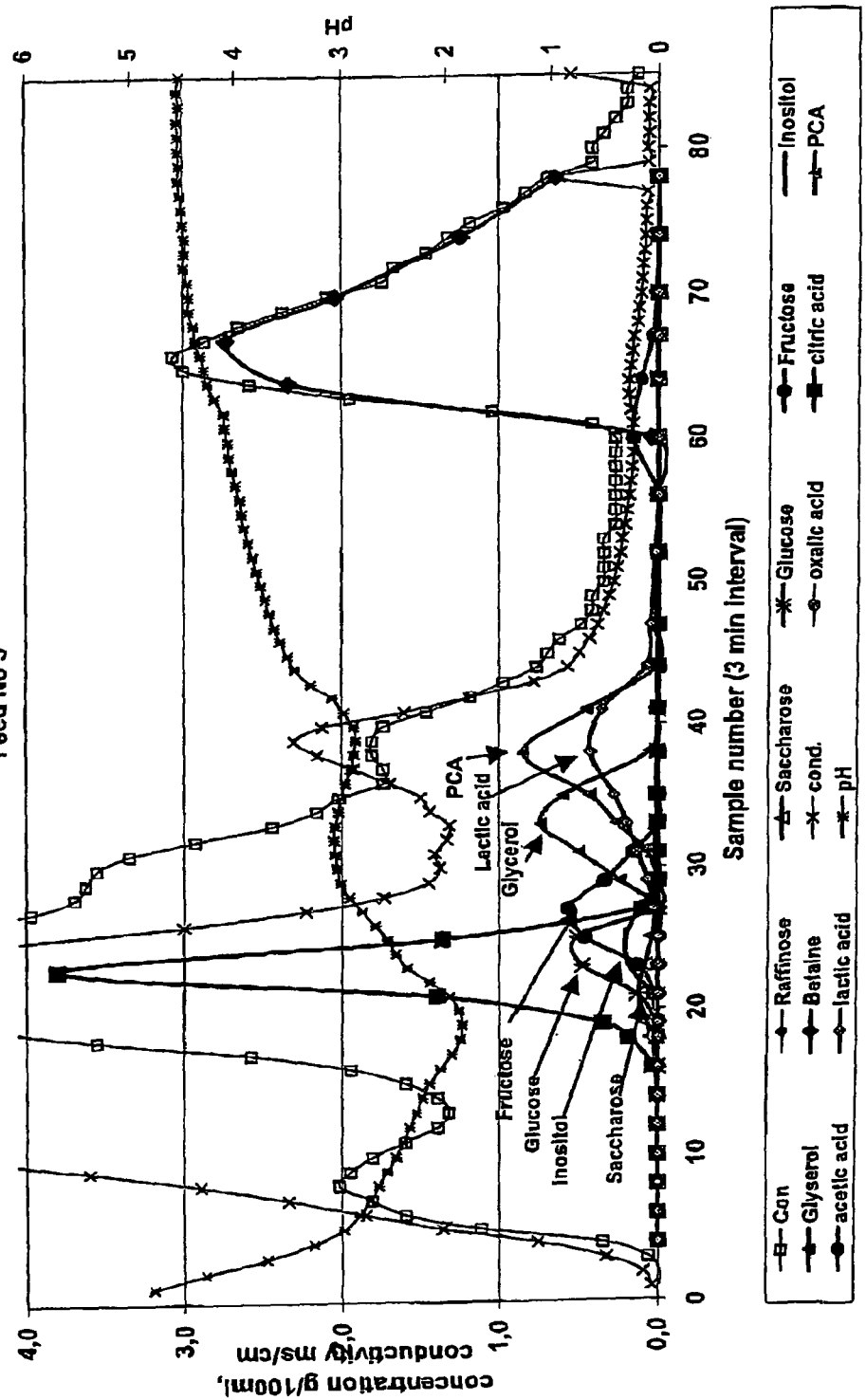
FIG. 2 is a graphical presentation of the elution profiles and pH according to Example 2.

The elution started with inorganic salts and continued with organic acids and alditols. Betaine eluted from the column as the last of the main components. The pH of the effluent varied between 1.9 and 4.6. Altogether 5 feeds were made, during which the resin ion form was not fully stabilized. After these separations 93% of the resin was in hydrogen form on the top of the resin bed. The resin separated betaine very well from other components; the hold-up volume was 75 min and the elution time was 278 min. The retention factor of betaine in this separation was 2.7. Betaine could be collected as a high purity (80-95%/DS) fraction with good yield (>90%). Citric acid was collected as a fraction with the purity of 20-50% on DS. Retention factors (k) of betaine and some organic acids of the feed solution are pre-sented in Table 1. The pKa values presented in Table 1 are derived from Lange's Handbook of Chemistry, (15$^{th}$ Edition), 1999. It can be seen, that these acids elute according to their $pK_a$ (1$^{st}$) value. Surprisingly, betaine, whose $pk_a$ value is 1.832, makes an exception and elutes as the last component. The separation profile is presented in FIG. 2.

TABLE 1

| compound | Hold-up time [min] | k | Elution time [min] | pKa 1$^{st}$/2$^{nd}$/3$^{rd}$ dissociation constant at 25° C. |
|---|---|---|---|---|
| oxalic acid | 75 | 0.6 | 120 | 1.271/4.272 |
| citric acid | 75 | 0.9 | 141 | 3.128/4.761/6.396 |
| lactic acid | 75 | 1.5 | 186 | 3.858 |
| acetic acid | 75 | 2.4 | 258 | 4.756 |
| betaine | 75 | 2.7 | 278 | 1.832 |

EXAMPLE 3

Chromatographic Separation of Vinasse with a Weakly Acid Cation Exchange Resin in $H^+$-form (pH 5.1)

The starting liquor used for the separation was vinasse from a fermentation process of ethanol. The vinasse contained mainly betaine, glycerol, inorganic salts, and organic acids and had approximately the following composition (% on RDS):

Betaine 13.8
Glycerol 12.3
Others 73.9

The pH of the solution was 5.1.

The solution was filtered via filter by using diatomaceous earth as a filter aid. The vinasse was used as the feed solution and it was subjected to chromatographic separation. The separation was performed in a pilot scale chromatographic separation column as a batch process. The column with a diameter of 0.09 m was filled with a weakly acid cation exchange resin (Finex CA 16 GC, 8% DVB, capacity 4.4 eqv/l) manufactured by Finex Oy, Finland. The resin was an acrylate based resin and the average particle size of the resin in sodium form was 0.41 mm. The resin was regenerated into hydrogen ($H^+$)-form whereafter the height of the resin bed was approximately 1.7 m. The temperature of the column, the feed solution and the eluent water was 75° C. The flow rate in the column was adjusted to 3 l/h. The chromatographic separation was carried out as follows:

Step 1: The dry substance of the feed solution was adjusted to 35 g dry substance in 100 g solution according to the refractive index (RI) of the solution.

Step 2: 0.6 l of preheated feed solution was pumped to the top of the resin bed.

Step 3: The feed solution was eluted downwards in the column by feeding preheated ion-exchanged water, whose pH was adjusted to 3-4 by formic acid, to the top of the column.

Step 4: 50 ml samples of the out-coming solution were collected at 5 min intervals. Concentration, conductivity (mS/cm) and pH of samples were determined. The composition of the samples was analyzed with HPLC ($Na^+$-column, 0.6 ml/min, 85° C., 0.003 M $Na_2SO_4$).

Figure 3:
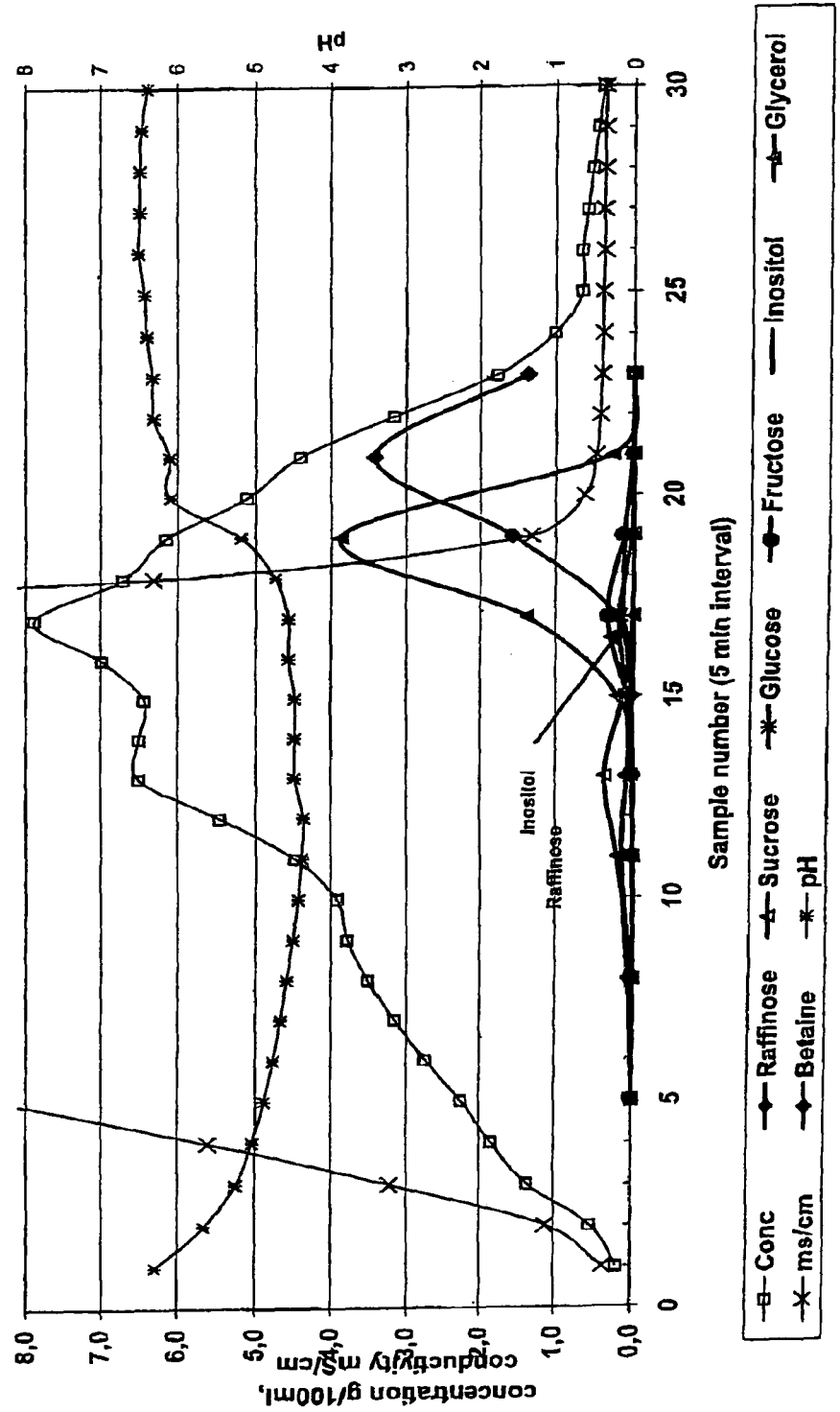
FIG. 3 is a graphical presentation of the elution profiles and pH according to Example 3.

The elution started with inorganic salts and continued with organic acids and alditols. Betaine eluted from the column later than other main components. The place of betaine peak shifted backwards (i.e. closer to the peaks of other components) before the equilibrium of the ionic form of the resin was reached. After 53 feeds 67% of the resin on the top of the resin bed was in $H^+$-form. At that stage the hold-up volume of betaine was 75 min and the elution time was 180 min. The retention factor of betaine was 1.3 and maximum purity of the betaine peak was over 75% /DS. The pH of the effluent varied between 4.4 and 6.3. The separation profile of 53rd feed is presented in FIG. 3.

EXAMPLE 4

Chromatographic Separation of Vinasse with a Weakly Acid Cation Exchange Resin in $H^+$-form (pH 4.2)

The starting liquor used for the separation was vinasse from a fermentation process of ethanol. The vinasse contained mainly betaine, glycerol, inorganic salts, and organic acids and had approximately the following composition (% on RDS):

Betaine 15.8
Glycerol 11.5
Others 72.7

The vinasse was used as the feed solution and it was subjected to chromatographic separation. The separation was performed in a pilot scale chromatographic separation column as a batch process. The column with a diameter of 0.09 m was filled with a weakly acid cation exchange resin (Finex CA 16 GC, 8% DVB, capacity 4.4 eqv/l). The resin was an acrylate based resin and the average particle size of the resin in sodium form was 0.41 mm. The resin was regenerated into hydrogen ($H^+$)-form after which the height of the resin bed was approximately 1.7 m. The temperature of the column and feed solution and eluent water was 75° C. The flow rate in the column was adjusted to 3 l/h. The pH of the feed solution was adjusted to 4.2 by sulphuric acid ($H_2SO_4$). The feed solution was filtered via filter by using diatomaceous earth as a filter aid.

The chromatographic separation was carried out as follows:

Step 1: The dry substance of the feed solution was adjusted to 35 g dry substance in 100 g solution according to the refractive index (RI) of the solution.

Step 2: 2 l of preheated feed solution was pumped to the top of the resin bed.

Step 3: The feed solution was eluted downwards in the column by feeding preheated ion-exchanged water, whose pH was adjusted to 4.2 by formic acid, to the top of the column.

Step 4: 50 ml samples of the outcoming solution were collected at 5 min intervals. Concentration, conductivity (mS/cm) and pH of samples were determined. The composition of the samples was analyzed with HPLC ($Na^+$-column, 0.6 ml/min, 85° C., 0.003 M $Na_2SO_4$).

Figure 4:
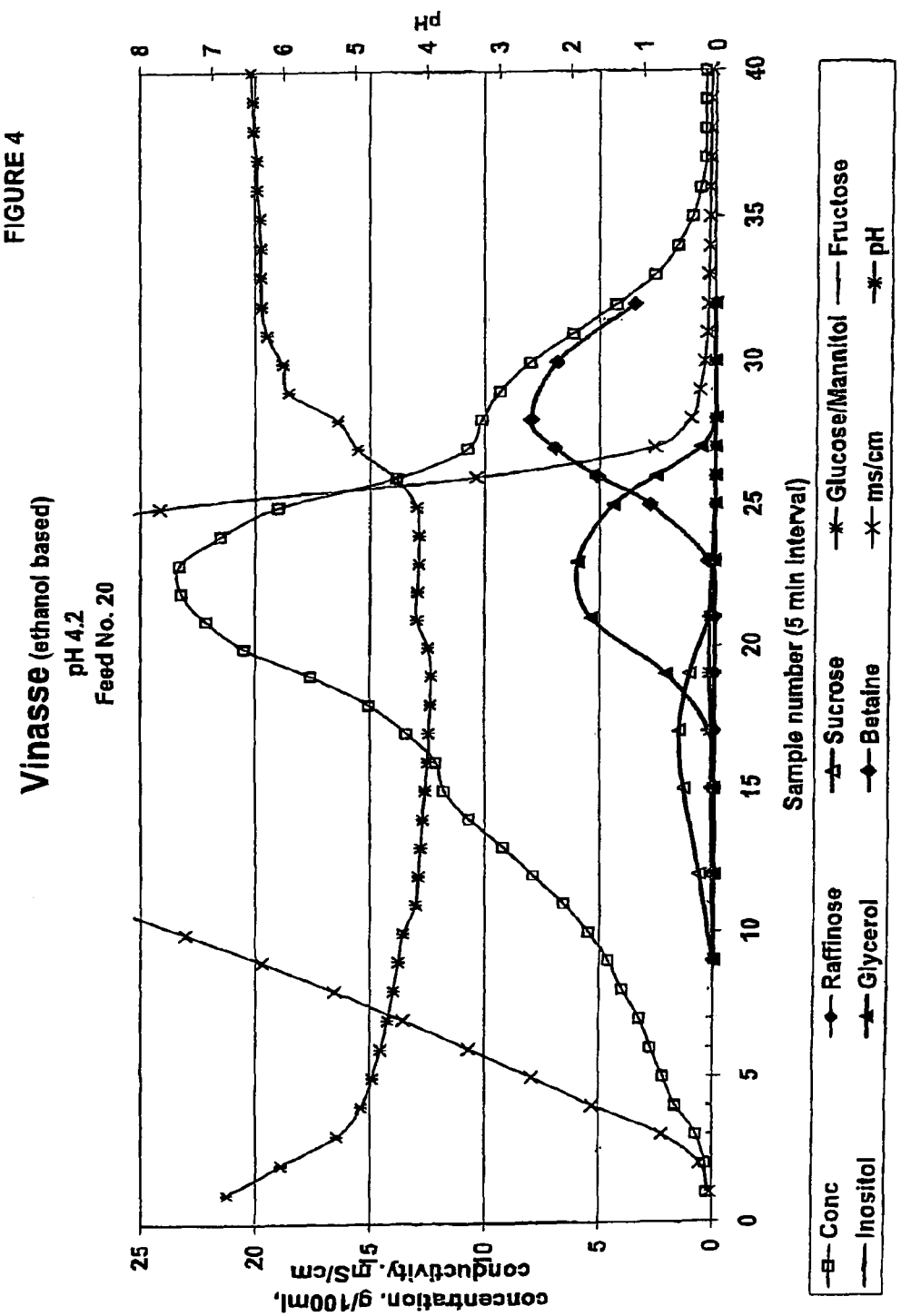
FIG. 4 is a graphical presentation of the elution profiles and pH according to Example 4.

The elution started with inorganic salts and continued with organic acids and alditols. Betaine eluted from the column later than other main components, but somewhat earlier compared to the lower feed pH separation presented in Example 2. The hold-up volume was 75 min and the elution time was 205 min. The retention factor of betaine at this pH was 1.7 and maximum purity over 80% on DS was obtained in betaine fraction. Purity of the glycerol fraction, which eluted before betaine, was over 20% on DS. Altogether 20 feeds were made, during which the resin ion form was stabilized; 89% of the resin was in hydrogen form on the top and bottom of the resin. The pH of the effluent varied between 4.0 and 6.4. The separation profile of 20th feed is presented in FIG. 4.

EXAMPLE 5

Chromatographic Separation of Vinasse with a Weakly Acid Cation Exchange Resin in $H^+$-form (pH 3.1)

The starting liquor used for the separation was vinasse from a fermentation process of citrc acid. The vinasse contained mainly betaine, glycerol, inorganic salts, and organic acids had approximately the following composition (% on RDS):
  Betaine 19.8
  Glycerol 3.0
  Others 77.2.

The vinasse was used as the feed solution and it was subjected to chromatographic separation. The separation was performed in a pilot scale chromatographic separation column as a batch process. The column with a diameter of 0.09 m was filled with a weakly acid cation exchange resin (Finex CA 16 GC, 8% DVB, capacity 4.4 eqv/l). The resin was an acrylate based resin and the average particle size of the resin in sodium form was 0.41 mm. The resin was regenerated into hydrogen ($H^+$)-form after which the height of the resin bed was approximately 1.6 m. The temperature of the column and feed solution and eluent water was 75° C. The flow rate in the column was adjusted to 3 l/h. The pH of the feed solution was 3.1.

The chromatographic separation was carried out as follows:

Step 1: The dry substance of the feed solution was adjusted to 35 g dry substance in 100 g solution according to the refractive index (RI) of the solution.

Step 2: 1.5 l of preheated feed solution was pumped to the top of the resin bed.

Step 3: The feed solution was eluted downwards in the column by feeding preheated ion-exchanged water, whose pH was adjusted to 3-4 by formic acid, to the top of the column.

Step 4: 50 ml samples of the out-coming solution were collected at 5 min intervals. Concentration, conductivity (mS/cm) and pH of samples were determined. The composition of the samples was analyzed with HPLC ($Na^+$-column, 0.6 ml/min, 85° C., 0.003 M $Na_2SO_4$).

Figure 5:
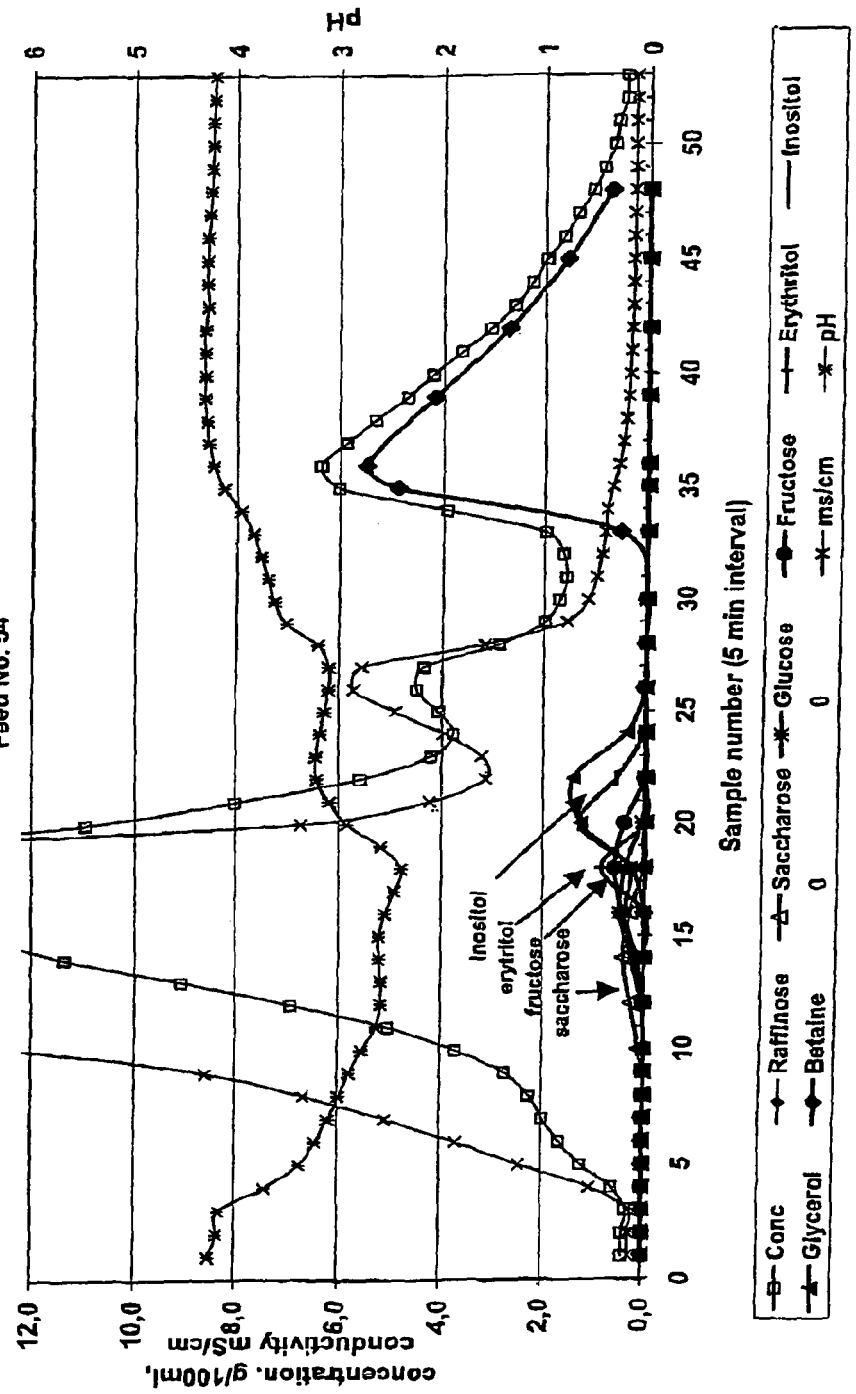
FIG. 5 is a graphical presentation of the elution profiles and pH according to Example 5.

The elution starts with inorganic salts and continues with organic acids and alditols. Betaine elutes from the column as the last of the main components. The hold-up volume for betaine was 75 min, the elution time was 245 min and its retention factor was 2.3. The pH of the effluent (e.g. the outcoming solution) varied between 2.4 and 4.3. Altogether 54 feeds were made, during which the resin ion form was stabilized, and >99% of the resin was in hydrogen form. The resin separates betaine very well from other components and maximum purity over 85% on DS was obtained in the betaine fraction. The separation profile is presented in FIG. 5.

EXAMPLE 6

Chromatographic Separation of Vinasse with a Weakly Acid Cation Exchange Resin in $H^+$-form (pH 1.4)

The starting liquor used for the separation was vinasse from a fermentation process of ethanol. The vinasse, which contained mainly betaine, glycerol, inorganic salts, and organic acids, had approximately the following composition (% on RDS):
  Betaine 14.0
  Glycerol 10.6
  Others 75.4.

The vinasse was used as the feed solution and it was subjected to chromatographic separation. The separation was performed in a pilot scale chromatographic separation column as a batch process. The column with a diameter of 0.09 m was filled with a weakly acid cation exchange resin (Finex CA 16 GC, 8% DVB, capacity 4.4 eqv/l). The resin was an acrylate based resin and the average particle size of the resin in sodium form was 0.41 mm. The resin was regenerated into hydrogen (H)-form after which the height of the resin bed was approximately 1.6 m. The temperature of the column and feed solution and eluent water was 75° C. The flow rate in the column was adjusted to 3 l/h. The pH of the feed solution was adjusted by strong sulphuric acid ($H_2SO_4$) to 1.4 and it was filtered via filter by using diatomaceous earth as a filter aid.

The chromatographic separation was carried out as follows:

Step 1: The dry substance of the feed solution was adjusted to 35 g dry substance in 100 g solution according to the refractive index (RI) of the solution.

Step 2: 0.7 l of preheated feed solution was pumped to the top of the resin bed.

Step 3: The feed solution was eluted downwards in the column by feeding preheated ion-exchanged water, whose pH was adjusted to 2.2 by strong $H_2SO_4$, to the top of the column.

Step 4: 50 ml samples of the out-coming solution were collected at 5 min intervals. Concentration, conductivity (mS/cm) and pH of samples were determined. The composition of the samples was analyzed with HPLC ($Na^+$-column, 0.6 ml/min, 85° C., 0.003 M $Na_2SO_4$).

The elution starts with inorganic salts and continues with organic acids and alditols. Betaine elutes from the column as the last of the main components. The hold-up volume for betaine was 75 min, the elution time was 290 min and its retention factor was 2.9. The pH of the effluent (e.g. the outcoming solution) varied between 1.3 and 3.3. The resin separates betaine very well from other components and maximum purity over 85% on DS was obtained in the betaine fraction. The separation profile is presented in FIG. 6.

EXAMPLE 7

Betaine Crystallization

The betaine containing feed liquid was added to a 400-liter boiling crystallizer. The evaporation was started. First spontaneous crystals were seen at DS of about 79%, at a temperature of 99° C. After spontaneous seeding, the boiling crystallization was continued for 3 hours at a temperature of about 100° C. and new feed liquid was added continuously into the boiling crystallizer. A 400-liter batch of the mass obtained by boiling crystallization (DS of mass 87%) was discharged. The mass was centrifuged and betaine anhydrous product was dried.

The invention claimed is:

1. A method for chromatographic separation of betaine from a sugar beet based solution comprising betaine, polyols, and carboxylic acids, said method comprising adjusting the pH of the sugar beet based solution to below 5.1 and subjecting the resulting solution to chromatographic separation on a weakly acid cation exchange resin in $H^+$-form, eluting betaine after polyols and carboxylic acids, and collecting a fraction enriched in betaine.

2. The method of claim 1 wherein the sugar beet based solution is a fermentation process solution.

3. The method of claim 2 wherein the fermentation process solution is citric acid, yeast or ethanol fermentation solution.

4. The method of claim 1 wherein the sugar beet based solution is a sugar beet derived process solution.

5. The method of claim 4 wherein the sugar beet derived process solution is vinasse, molasses or betaine molasses.

6. The method of claim 1 wherein at least one column or a part of a column containing a weakly acid cation exchange resin in $H^+$-form is used in the chromatographic separation.

7. The method of claim 1 wherein the weakly acid cation exchange resin is an acrylic resin.

8. The method of claim 7 wherein the acrylic resin is derived from the group consisting of methyl acrylate, ethyl acrylate, butyl acrylate, methyl methacrylate and acrylonitrile or acrylic acids or mixtures thereof.

9. The method of claim 7 wherein the resin is crosslinked with divinyl benzene (DVB).

10. The method of claim 9 wherein the crosslinking degree of the resin is 3 to 8% by weight.

11. The method of claim 1 wherein the eluent used in the chromatographic separation is water.

12. The method of claim 1 wherein the temperature of the eluent used in the chromatographic separation is between 10° C. and 95° C.

13. The method of claim 12 wherein the temperature of the eluent is between 65° C. and 95° C.

14. The method of claim 1 wherein the particle size of the weakly acid cation exchange resin is 10 to 2000 µm.

15. The method of claim 14 wherein the particle size of the weakly acid cation exchange resin is 100 to 400 µm.

16. The method of claim 1 wherein the chromatographic separation is a batch process.

17. The method of claim 1 wherein the chromatographic separation is a simulated moving bed process.

18. The method of claim 17 wherein the simulated moving bed process is a sequential process.

19. The method of claim 17 wherein the simulated moving bed process is a continuous process.

20. The method of claim 1 wherein the method further comprises separating a polyol and/or a carboxylic acid as an additional compound.

21. The method of claim 1 wherein the polyol is inositol and/or glycerol.

22. The method of claim 1 wherein the carboxylic acids are selected from citric acid, lactic acid, acetic acid and pyrrolidone carboxylic acid.

23. The method of claim 1 wherein a fraction enriched in citric acid is separated from the solution.

24. The method of claim 23 wherein the citric acid purity of the citric acid fraction is over 20% on DS.

25. The method of claim 1 wherein the method further comprises recovering betaine from the separated fraction.

26. The method of claim 25 wherein the recovery is made by crystallization.

27. The method of claim 1 wherein adjustment of the pH of the chromatographic separation is used to regulate or control the retention factor of betaine.

28. The method of claim 27 wherein the pH of the chromatographic separation is adjusted by the pH of the feed solution.

29. The method of claim 27 wherein betaine is separated from other carboxylic compounds and/or polyols.

30. The method of claim 29 wherein the carboxylic compound is citric acid, lactic acid and/or pyrrolidone carboxylic acid.

31. The method of claim 29 wherein betaine fraction and citric acid fraction are separated from the solution.

32. The method of claim 29 wherein betaine is separated from polyol compounds.

33. The method of claim 32 wherein the polyol is inositol and/or glycerol.

34. The method according to claim 32 wherein the amount of the undissociated COOH-form of the weakly acid cation exchange resin is greater than 90%.

35. The use of claim 1 wherein betaine is separated from other carboxylic compounds and/or polyols.

36. The method according to claim 1 wherein the weakly acid cation Exchange resin in $H^+$-form contains greater than 50% of undissociated COOH-form.

37. The method according to claim 36 wherein the amount of the undissociated COOH-form of the weakly acid cation exchange resin is at least 67%.

38. The method of claim 1 wherein the pH of the sugar beet based solution is adjusted to a value between 1.4-5.1.

39. The method of claim 1 wherein the pH of the sugar beet based solution is adjusted to a value between 3-4.5.

40. The method of claim 1 wherein the betaine purity of the fraction enriched in betaine is more than 50% on DS.

41. The method of claim 1 wherein the betaine purity of the fraction enriched in betaine is more than 70% on DS.

* * * * *